United States Patent [19]
Yokoyama et al.

[11] Patent Number: 4,495,275
[45] Date of Patent: * Jan. 22, 1985

[54] SILVER HALIDE PHOTOGRAPHIC MATERIALS

[75] Inventors: Shigeki Yokoyama; Kunihiko Ohga, both of Kanagawa, Japan

[73] Assignee: Fuji Photo Film Co., Ltd., Kanagawa, Japan

[*] Notice: The portion of the term of this patent subsequent to Dec. 28, 1999 has been disclaimed.

[21] Appl. No.: 277,370

[22] Filed: Jun. 25, 1981

[30] Foreign Application Priority Data

Jun. 25, 1980 [JP] Japan ................................. 55-86201
Apr. 28, 1981 [JP] Japan ................................. 56-64702

[51] Int. Cl.$^3$ .............................................. G03C 1/78
[52] U.S. Cl. .................................. 430/527; 430/631; 430/627
[58] Field of Search ................ 430/527, 627, 631, 536

[56] References Cited

U.S. PATENT DOCUMENTS

| | | | |
|---|---|---|---|
| 3,840,371 | 10/1974 | Usami et al. | 96/67 |
| 4,070,189 | 1/1978 | Kelley et al. | 430/527 |
| 4,229,524 | 10/1980 | Yoneyama et al. | 430/527 |
| 4,266,015 | 5/1981 | Butler et al. | 430/527 |
| 4,267,265 | 5/1981 | Sugimoto et al. | 430/527 |
| 4,292,402 | 9/1981 | Pollet et al. | 430/631 |
| 4,366,238 | 12/1982 | Yokoyama et al. | 430/527 |

*Primary Examiner*—Jack P. Brammer
*Attorney, Agent, or Firm*—Sughrue, Mion, Zinn, Macpeak, and Seas

[57] ABSTRACT

The antistatic property of a silver halide photographic material is effectively improved by incorporating a fluorine-containing water-soluble polymer having a styrene monomer containing a fluorine-containing group as the polymerization unit in at least one of the photographic layers of the photographic material. The incorporation of the polymer does not reduce the adhesion resistance or film strength of the photographic material. The photographic material can also maintain the improved antistatic property for a long period of time.

5 Claims, No Drawings

SILVER HALIDE PHOTOGRAPHIC MATERIALS

FIELD OF THE INVENTION

This invention relates to silver halide photographic materials (which herein refers to "photographic materials") and more particularly to photographic materials having improved antistatic property.

BACKGROUND OF THE INVENTION

Since photographic material is generally composed of a support having an electric-insulating property and photographic layers formed thereon, an electrostatic charge is frequently accumulated on the photographic material by the contact friction of the surface thereof with the surface of the same kind of photographic material or a foreign material. An electrostatic charge can also be accumulated by the separation of the surface thereof from the surface of the same kind of photographic material or a foreign material during the production thereof or during use. The accumulated electrostatic charge causes various problems the most serious of which is that the accumulated electrostatic charge is discharged before development. This discharge partially exposes the photosensitive silver halide emulsion layers of the photographic material. This partial exposure results in forming dot-like spots or branch-like or feather-like spots after development of the photographic material. These spots or so-called static marks greatly reduce the commercial value of the photographic film. The problems resulting from the formation of static marks on medical or industrial X-ray film are apparent. The occurrence of this phenomenon creates an addition problem since the occurrence of the phenomenon cannot be confirmed prior to development of the photographic material. Furthermore, the accumulated electrostatic charge induces secondary problems such as attaching dust onto the surface of the photographic film and making it difficult to uniformly coat photographic layers on the support.

An electrostatic charge, as described above, is frequently accumulated during the production and use of photographic materials. For example, an electrostatic charge is created by frictional contact between a photographic film and rollers during the production step for the photographic film or by the separation of the support of a photographic film from the silver halide emulsion layer surface thereof during the winding or rewinding process of the photographic film. Furthermore, an electrostatic charge is created by the contact friction of an X-ray film with a mechanical part or a fluorescent intensifying screen in an automatic X-ray camera, and by the contact friction of a photographic film with a packaging material. The occurrence of the static mark of a photographic material induced by the accumulation of such an electrostatic charge becomes increasingly serious as the sensitivity and processing speed of the photographic material increase. In recent times, photographic material is frequently subjected to severe processings such as high sensitization and high speed coating of photographic material, high speed photographing, high speed automatic processing. Accordingly, the static mark is more likely to form.

In order to remove problems created by the electrostatic charge, it is preferable to add antistatic agents to photographic materials. However, antistatic agents generally used in other fields than photography cannot always be used as the antistatic agents for photographic materials. Furthermore, there are various restrictions specific to photographic materials about the antistatic agents which are used for photographic materials. In addition to possessing excellent antistatic properties, the antistatic agents used in photographic materials must not give bad influences on the photographic properties of photographic materials, such as the sensitivity, fog formation, granularity, sharpness. Furthermore, the agents must not have: bad influences on the film strength of photographic materials (i.e., the photographic materials containing the antistatic agents are not readily scratched when rubbed together or scraped with solid materials); or bad influences on the adhesive property of the photographic materials (i.e., the photographic materials containing the antistatic agents do not readily stick to each other or to the surfaces of foreign materials). Furthermore, the agents must not accelerate fatigue of processing solutions for photographic materials or reduce the bonding strength between the photographic layers of the photographic materials. Thus, there are many restrictions with respect to the application of antistatic agents to photographic materials.

In accordance with one method for eliminating problems created by electrostatic charge, the electric conductivity of the surface of a photographic material is increased so that the electrostatic charge flees in a short period of time before the charge is accumulated and discharged.

There have been prior attempts to improve the electric conductivity of the supports for photographic materials and various coated surface layers and the utilization of various hygroscopic materials or water-soluble inorganic salts. These attempts involve the use of certain kinds of surface active agents, polymers. For example, there are the polymers as described in U.S. Pat. Nos. 2,882,157, 2,972,535, 3,062,785, 3,262,807, 3,514,291, 3,615,531, 3,753,716, 3,938,999, etc.; the surface active agents as described in U.S. Pat. Nos. 2,982,651, 3,428,456, 3,457,076, 3,454,625, 3,552,972, 3,655,387, etc.; and the metal oxides and colloidal silicas as described in U.S. Pat. Nos. 3,062,700, 3,245,833, 3,525,621, etc.

However, these materials show a different specificity for different kind of film support or different photographic composition. Therefore, some materials described above give good results for specific film supports and photographic silver halide emulsions or other photographic constituting elements. However, they are not only useless for static prevention of other film supports and photographic constituting elements but have bad influences on photographic properties.

Other materials possess an excellent antistatic effect but cannot be used for photographic materials because they have bad influences on photographic materials such as the sensitivity of photographic silver halide emulsions, the formation of fog, granularity and sharpness. For example, it is generally known that polyethylene oxide series compounds have an antistatic effect. However, they frequently have bad influences on the photographic properties, such as the increase of fog, the desensitization and the deterioration in granularity. Particularly, in a photographic material having photographic silver halide emulsion layers coated on both sides of a support as a medical direct X-ray photographic film, it has been difficult to establish a technique of effectively creating an antistatic property without having bad influences on the photographic properties.

As described above, the application of antistatic agents to photographic materials frequently encounters various difficulties and the applicable range is limited.

According to another method of eliminating the problems on photographic materials caused by electrostatic charge, the static potential of the surface of a photographic material is controlled. This minimizes the generation of static electricity by friction or contact as described before.

For example, attempts have been made which utilize fluorine-containing surface active agents as described in British Pat. Nos. 1,330,356 and 1,524,631, U.S. Pat. Nos. 3,666,478 and 3,589,906, Japanese Patent Publication No. 26687/77 and Japanese Patent Application (OPI) Nos. 46733/74 and 32322/76 (the term "OPI" as used herein refers to a "published unexamined Japanese patent application"). However, since the electrostatic characteristics of the photographic materials containing these fluorine-containing surface active agents utilize the characteristics of surface active agent, such as a monomolecular film formation, etc., they are greatly dependent upon the conditions for producing these photographic materials. Therefore, it is very difficult to produce stable photographic products having constant quality and constant electrostatic characteristics. For example, the electrostatic characteristics of photographic materials produced change greatly dependent upon temperature and humidity during the coating of photographic layers on supports, as well as temperature, humidity and drying time during drying of the photographic materials after coating. Photographic products having good properties are obtained under certain conditions but photographic materials having very inferior electrostatic characteristics are formed in other cases. This creates a serious problem with respect to quality control. The fluorine-containing surface active agents are inferior in that even if the photographic materials containing these surface active agents have good electrostatic characteristics immediately after production, the electrostatic characteristics become inferior with the passage of time.

In an attempt to overcome the difficulties caused by the use of these fluorine-containing surface active agents, fluorine-containing polymers have been used in photographic materials. These attempts involve the use of homopolymers or copolymers of the acrylic acid esters or methacrylic acid esters of fluorine-containing alcohols as described in British Pat. No. 1,497,256; the use of copolymers prepared by copolymerizing the aforesaid fluorine-containing monomers and a monomer having a polyethylene oxide chain as described in Japanese Patent Application (OPI) No. 158222/79; the use of copolymers prepared by copolymerizing the aforesaid fluorine-containing monomers or such fluorine-containing monomers as the vinyl esters of fluorine-containing carboxylic acids, fluorine-containing vinyl ethers, fluorine-substituted olefins, etc., with a monomer having quaternary nitrogen as described in British Patent No. 1,535,685; or the use of interpolymers prepared by interpolymerizing the maleic acid esters of a fluorine-containing alcohol, maleic acid, and other monomer.

By using these fluorine-containing polymers in a photosensitive material, some control of the electrification voltage on the surface of the photosensitive material can be achieved, and the generation of static charge due to friction or contact with other materials can be reduced to some extent. The polymers offer some solution to the problems with the aforementioned fluorine-containing surfactants, i.e., great dependence of the electrostatic characteristics on process conditions, and their degradation with time. However, the photo-sensitive material containing these fluorine-containing polymers is still unsatisfactory in electrostatic characteristics and its photographic properties and the physical properties of the film that are important factors of photosensitive material are not as good as desired. These problems reduce the commercial value of the photosensitive material greatly, and it is practically impossible to use these polymers in a photosensitive material. For example, layers in a photosensitive material incorporating an emulsion of the fluorine-containing polymer described in British Patent No. 1,497,256 are so sticky that the emulsion layers in two such photosensitive materials easily adhere to each other, or the emulsion layer in one photosensitive material adheres to the backing layer of an adjacent photosensitive material. The two layers cannot be separated from each other at all, or a readily visible bare patch appears upon pulling them apart. In addition, scars are easily formed in layers in the photosensitive material incorporating these polymers when they are abraded or scratched by another material. All of these problems can reduce the commercial value of the photosensitive material considerably. Japanese Patent Application (OPI) Nos. 158222/79, 129520/77 and Japanese Patent Publication No. 23828/74 also disclose a fluorine-containing polymer, but when it is incorporated in a photosensitive material, its ability to control electrification voltage is so low that it must be contained in the photosensitive material in high proportions. Not only does this increase the production cost but it also affects adversely the photographic characteristics (e.g., reduced sensitivity and density as well as increased fogging) and the physical properties of the film (e.g., vulnerability to scratches). Therefore, it has so far been impossible to use these polymers in photosensitive materials.

SUMMARY OF THE INVENTION

A first object of this invention is, therefore, to provide photographic materials having improved antistatic properties.

A second object of this invention is to provide photographic materials having a combination of good antistatic properties and good adhesion resistance.

A third object of this invention is to provide static preventing photographic materials which have high film strength and are resistant to being scratched.

A fourth object of this invention is to provide photographic materials which can be stably produced with constant qualities without changing the electrostatic properties thereof by the production conditions therefor.

A fifth object of this invention is to provide photographic materials having stable qualities, the electrostatic properties of which do not change with the passage of time after the production thereof.

A sixth object of this invention is to provide photographic materials of which the antistatic property has been improved without having bad influences on the photographic properties such as the sensitivity, the formation of fog or the granularity.

A seventh object of this invention is to provide an antistatic agent for photographic materials which has sufficient antistatic effects with only small additive amounts.

An eighth object of this invention is to provide photographic materials which can be produced easily and efficiently.

These objects can be attained by incorporating in at least one of the layers constituting a photographic material a fluorine-containing water-soluble polymer (i.e., a polymer having a solubility of at least 0.1 g/100 g water at 20° C.) having the styrene monomer having a fluorine-substituted group as shown by the following general formula (I) as the polymerization unit:

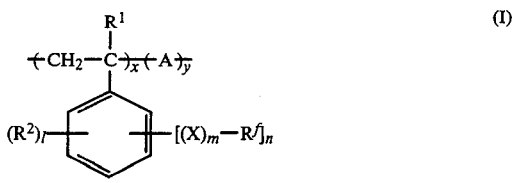

wherein A represents a monomer unit formed by the copolymerization of a copolymerizable monomer having at least one ethylenically unsaturated group; $R^1$ represents hydrogen, halogen atom, or an alkyl group having 1 to 3 carbon atoms; $R^2$ can represent a monovalent substituent, and, when l is more than one, two $R^2$ groups together can represent an atomic group forming a ring; $R^f$ represents an alkyl group having 1 to 30 carbon atoms, an aralkyl group, an aryl group or an alkylaryl group, wherein at least one hydrogen has been substituted by a fluorine atom; X represents a divalent coupling group shown by general formula $-(R)_p-L-$, wherein R is an alkylene group, an arylene group, or an aralkylene group; L is an oxy group, a thioxy group, an imino group, a carbonyl group, a carboxy group, a carboxythio group, a carboxyamido group, an oxycarbonyl group, a carbamoyl group, a sulfone group, a sulfonamido group, an N-alkylsulfonamido group, a sulfamoyl group, a sulfoxyl group or a phosphate group; and p is 0 or 1; l is an integer of 0 to 4; m is an integer of 0 to 3; n is an integer of 1 to 5; x is 0.1 to 50 mol% and y is 50 to 99.9 mol%.

DETAILED DESCRIPTION OF THE INVENTION

Particularly preferred polymers of the formula (I) are those which have the following formula (II):

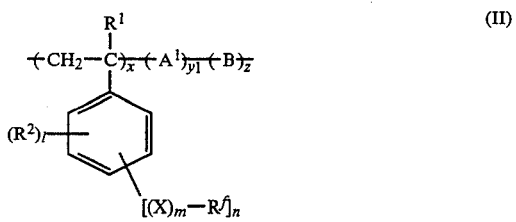

wherein $A^1$ is a monomeric unit wherein a copolymerizable monomer having an ethylenically unsaturated group and soluble in an amount of 10 g or more in 100 g water is copolymerized; B is a monomeric unit wherein a copolymerizable monomer having an ethylenically unsaturated group and soluble in an amount of less than 10 g in 100 g of water is copolymerized; $R^1$, $R^2$, $R^f$, X, l, m and n have the same meaning as in the formula (I); x is 0.1 to 50 mol%, $y_1$ is 20 to 99.9 mol%, and z is 0 to 79.9 mol%.

Some compounds having the formula (II) which are preferred for the purposes of this invention are listed below. In the formula (II), $A^1$ is a monomeric unit wherein a copolymerizable monomer having an ethylenically unsaturated group and soluble in an amount of 10 g or more in 100 g of water is copolymerized. Examples of such monomer include nonionic monomers represented by acrolein, acrylamide, methacrylamide, N-methylolacrylamide, N,N-dimethylaminoethyl acrylamide, N,N-dimethylaminopropyl acrylamide, hydroxyethyl acrylate, hydroxyethyl methacrylate, N,N-dimethylaminoethyl acrylate, N,N-dimethylaminoethyl methacrylate, poly(ethyloxy)acrylate, poly(ethyloxy)methacrylate, 2-vinylpyridine, 4-vinylpyridine, 1-vinyl-2-pyrrolidone, 1-vinylimidazole, and 1-vinyl-2-methylimidazole; a cationic monomer represented by vinylbenzyltrimethyl ammonium salt, vinylbenzyltriethyl ammonium salt, vinylbenzyltripropyl ammonium salt, vinylbenzyldimethylamine hydrochloride, methacryloxyethyltrimethyl ammonium salt, methacryloxyethyldimethyl ammonium salt and N,N-dimethylaminoethyl methacrylate hydrochloride; and anionic monomers represented by acrylic acid, methacrylic acid, maleic acid, styrenesulfonic acid, 2-acrylamido-2-methylpropanesulfonic acid and salts thereof. Monomers preferred as $A^1$ are by no means limited to the above examples. Nonionic monomers are particularly preferred. In the formula (II), B is a monomeric unit wherein a copolymerizable monomer having an ethylenically unsaturated group and soluble in an amount of less than 10 g in 100 g of water is copolymerized. Examples of such monomer include olefins such as ethylene, propylene and 1-butene; styrene or styrene derivatives such as α-methylstyrene, vinyltoluene, chloromethylstyrene, and divinylbenzene; ethylenically unsaturated esters of organic acids such as vinyl acetate and allyl acetate; ethylenically unsaturated carboxylic acid esters such as methyl acrylate, methyl methacrylate, n-butyl acrylate, n-butyl methacrylate, benzyl acrylate, benzyl methacrylate, cyclohexyl acrylate, cyclohexyl methacrylate and 2-ethylhexyl acrylate; ethylenically unsaturated carboxylic acid amides such as N-butylacrylamide and N-amylacrylamide; dienes such as butadiene and isoprene; acrylonitrile, vinyl chloride and maleic anhydride. Monomers preferred as B are by no means limited to these examples. Styrene and styrene derivatives are particularly preferred.

Further examples of the monomers $A^1$ and B are described in *Polymer Handbook*, 2nd Ed., edited by J. Brandrup and E. H. Immergut, pages VII-1 to VII-11, John Wiley & Sons, 1975.

$R^1$ in the general formula represents hydrogen, a halogen atom or an alkyl group having 1 to 3 carbon atoms, and hydrogen is particularly preferred. $R^2$ represents a monovalent substituent and examples of such a substituent are a halogen atom, a nitro group, an amino group, an alkylamino group, a carboxy group, a sulfonic acid group, a carboxylic acid ester group, a sulfonic acid ester group, a carbamoyl group, a sulfamoyl group, an alkylsulfonyl group, an alkoxy group, a thioalkoxy group, an alkyl group and an aryl group. Examples of these substituents are further described in, *Kagaku Binran*, Kisohen II (*Chemical Handbook*, Chapter II), 2nd Edition, pages 1012–1013, edited by Chemical Society of Japan (published by Maruzen K.K.) and *Acta Chim. Sinica*, Vol. 32, 107 (1966).

$R^2$ preferably represents a halogen atom, a nitro group, an alkyl group, etc.; and two $R^2$ groups may combine with each other to form a ring such as, for example, a benzene ring, fused with the benzene ring shown in formula (II).

$R^f$ represents an alkyl group having from 1 to 30 carbon atoms, and preferably from 1 to 20 carbon atoms, an aralkyl group, an aryl group or an alkylaryl group at least one hydrogen of each of which has been substituted by a fluorine atom and preferred examples are a perfluoromethyl group, perfluoroethyl group, perfluoropropyl group, perfluorohexyl group, perfluorooctyl group, 2,2,3,3-tetrafluoropropyl group, 2,2,3,3,4,4,5,5-octafluoroamyl group, 2,2,3,3,4,4,5,5,6,6,7,7-dodecafluorobutyl group, 2,2,2-trifluoroethyl group, 2,2,3,3,4,4,4-heptafluorobutyl group, 1,1,1,3,3,3-hexafluoro-2-propyl group, 1,1,1,3,3,3-hexafluoro-2-hydroxy-2-propyl group, 1,1,2,2-tetrafluoro-2-hydroxyethyl group, p-fluorophenyl group, p-trifluoromethylphenyl group, 2,3,4,5,6-pentatrifluoromethylphenyl group.

X represents a divalent coupling group shown by general formula $—(R)_p—L—$ (wherein R is an alkylene group, an arylene group or an aralkylene group; L represents an oxy group, a thioxy group, an imino group, a carbonyl group, a carboxy group, a carbothioxy group, a carboxyamido group, an oxycarbonyl group, a carbamoyl group, a sulfone group, a sulfonamido group, an N-alkylsulfonamido group, a sulfamoyl group, a sulfoxy group or a phosphate group; and p is 0 or 1).

In general formula (I), l is an integer of 0 to 4, preferably 0 to 2; m is an integer of 0 to 3, preferably 0 or 1; n is an integer of 1 to 5, preferably 1 or 2; x is 0.1 to 50 mol%, preferably 0.5 to 20 mol%, and $y_1$ is 50 to 99.9 mol%, preferably 20 to 99.5 mol%.

The polymer of this invention can be obtained by polymerizing the fluorine-containing monomer shown by the following general formula (III) or by copolymerizing the monomer of formula (II) with the monomer shown by $A^1$ and if desired with the monomer shown by B in above-described general formula (II). In this case, two or more fluorine-containing monomers shown by formula (II) may be employed and further two or more monomers of A may be also employed:

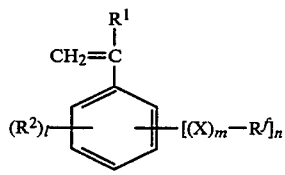

(III)

wherein $R^1$, $R^2$, $R^f$, X, l, m, and n are defined in the same manner as in general formula (I).

The polymer of this invention is produced by various polymerization methods. Examples of these methods include: solution polymerization, emulsion polymerization, reversed phase emulsion polymerization, precipitation polymerization, suspension polymerization and bulk polymerization. Polymerization may also be initiated by using a radical initiator, a thermal polymerization method, a method of irradiating photo or electromagnetic radiation, a cation polymerization method and an anion polymerization method. These polymerization methods and polymerization initiation methods are described in Teiji Tsuruta, *Kobunshi Gosei Hanno* (*Polymer Synthesis Reaction*), revised edition (published by Nikkan Kogyo Shinbun Sha, 1971), and Fred W. Billmeyer Jr., *Textbook of Polymer Science*, Second Ed. (Wiley-Interscience, 1971).

Of these methods, the solution polymerization method is particularly preferred. Preferred solvents for use in the solution polymerization are organic solvents of high polarity such as N,N-dimethylformamide, N,N-dimethylacetamide, dimethylsulfoxide, methanol, ethanol, 1-propanol, 2-propanol and acetone.

The polymer of the formula (II) according to this invention can also be produced by reacting a fluorine compound having a functional group with a homopolymer of a non-fluorine styrene monomer having a functional group or a copolymer thereof with the monomer $A^1$, and if necessary, with monomer B in the polymer of the formula (II). Illustrative non-fluorine styrene monomers having a functional group are hydroxymethylstyrene, aminomethylstyrene, aminostyrene, hydroxystyrene, carboxystyrene, mercaptostyrene, mercaptomethylstyrene, chloromethylstyrene, vinylbenzoic acid chloride, etc. Illustrative fluorine compounds having a functional group are $R^f$—COCl, $R^f$—OH, $R^f$—NH$_2$, $R^f$—SO$_2$Cl, etc., $R^f$ having the same meaning as defined for the formula (I). The water-soluble polymer of formula (II) can also be produced by performing hydrolysis and other reactions on a copolymer of a fluorine-containing monomer of the formula (III) and the monomer B in the formula (II). The polymer of the formula (I) may likewise be produced from the monomer of the formula (III) and the monomer A in the formula (I).

Examples of the fluorine-containing monomer shown by formula (III) used in this invention are shown below:

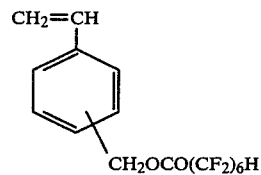

M-1

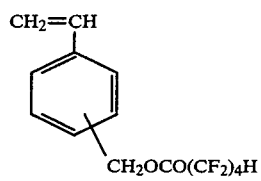

M-2

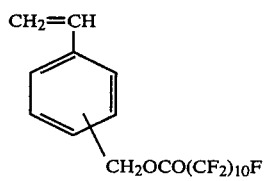

M-3

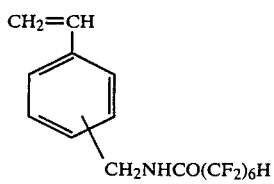

M-4

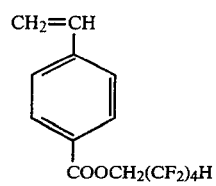 M-5
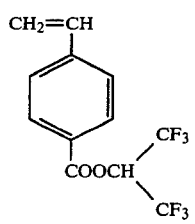 M-6
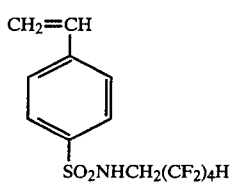 M-7
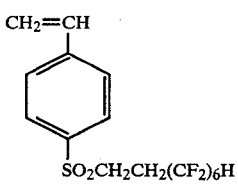 M-8
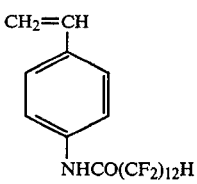 M-9
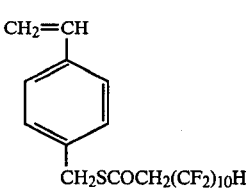 M-10
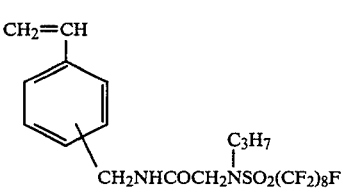 M-11
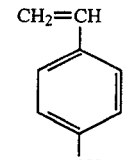 M-12
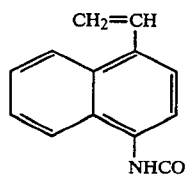 M-13
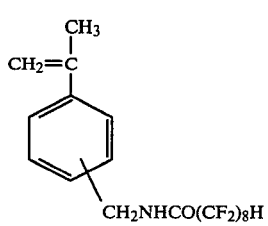 M-14
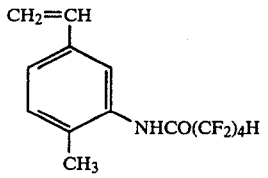 M-15
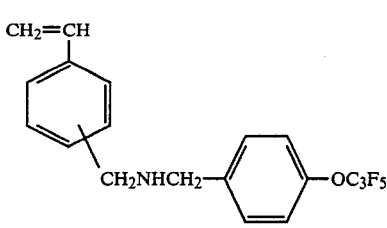 M-16
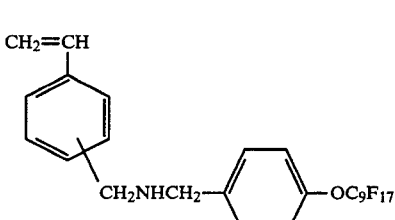 M-17
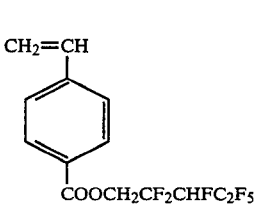 M-18

-continued
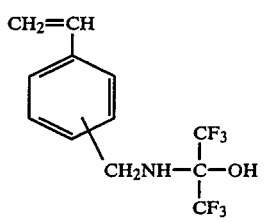 M-19
 M-20
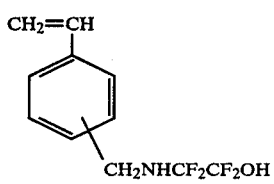 M-21
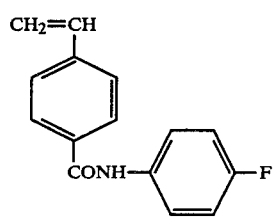 M-22
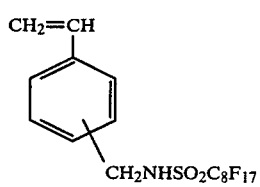 M-23
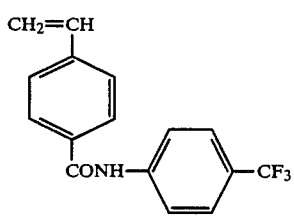 M-24
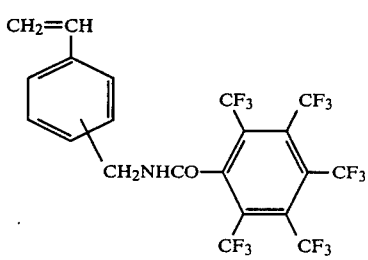 M-25
-continued
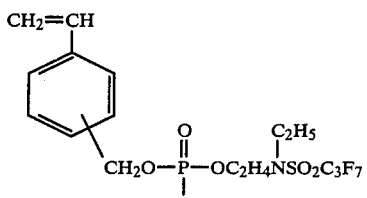 M-26
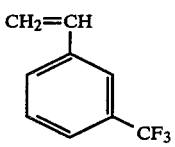 M-27
Examples of the fluorine-containing polymers according to formula (II) of this invention are illustrated below.
Examples of polymers:
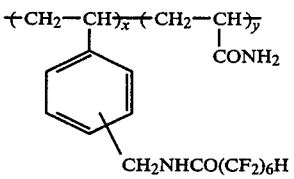 P-1
x:y = 2.1:97.9
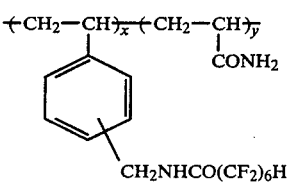 P-2
x:y = 0.6:99.4
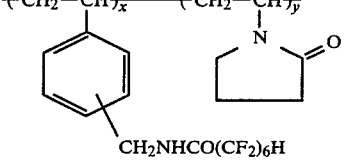 P-3
x:y = 3.7:96.3
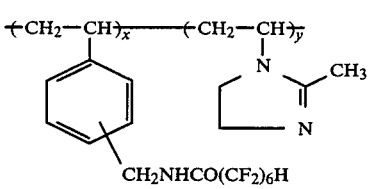 P-4
x:y = 2.9:97.1
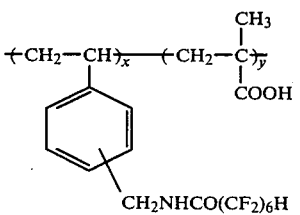 P-5
x:y = 2.5:97.5

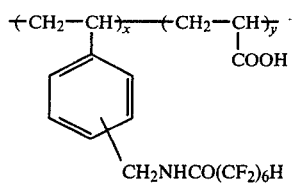

x:y = 2.0:98.0

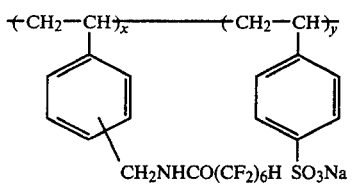

x:y = 35:65

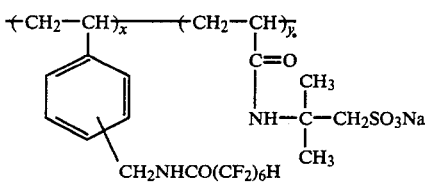

x:y = 31:69

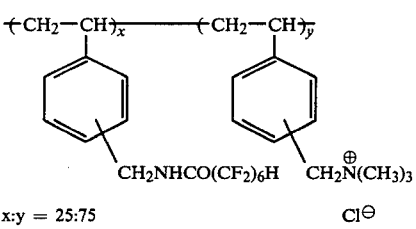

x:y = 25:75

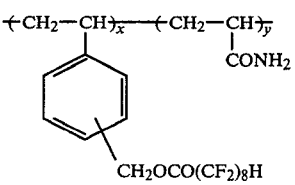

x:y = 1.2:98.8

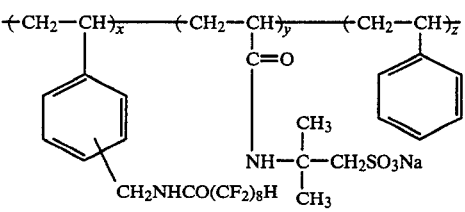

x:y:z = 20:72:8

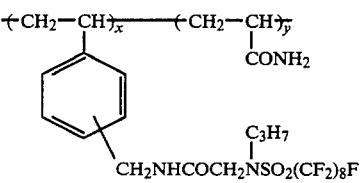

x:y = 0.5:99.5

P-6

P-7

P-8

P-9

P-10

P-11

P-12

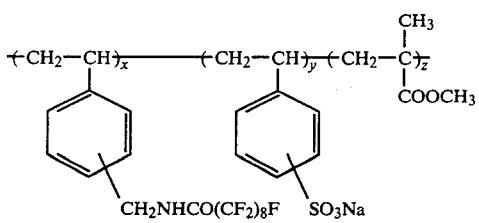

x:y:z = 25:70:5

P-13

Synthesis examples for the polymers and the raw materials therefor are described below:

SYNTHESIS EXAMPLE 1

Synthesis of Monomer (M-1), 2,2,3,3,4,4,5,5,6,6,7,7-dodecafluoro-n-heptanoic acid vinylbenzyl ester In a 500 milliliter three neck flask equipped with a stirrer, a reflux condenser, and a calcium chloride drying tube was placed 289.3 g (0.836 mol) of 2,2,3,3,4,4,5,5,6,6,7,7-dodecafluoro-n-heptanoic acid and then the acid was cooled with ice water. Then, 149.2 g (0.836×1.5 mol) of thionyl chloride was poured slowly into the acid with stirring and 3.3 g (0.836×0.05 mol) of pyridine was further added dropwise to the mixture. Thereafter, the flask was heated to 100° C. and the mixture was stirred for 4 hours. After cooling the reaction mixture, the acicular crystals and light yellow solid materials precipitated were filtered away, remaining thionyl chloride was distilled off, and the chloride of fluorocarboxylic acid thus formed was purified by a normal pressure distillation. Thus, 280.3 g (yield of 92.0%) of 2,2,3,3,4,4,5,5,6,6,7,7-dodecafluoro-n-heptanoic acid chloride (colorless liquid, boiling point of 131° to 133° C.) was obtained.

In a 300 milliliter three neck flask equipped with a stirrer, a reflux condensor, and a calcium chloride drying tube were placed 100 ml of diethyl ether, 40.2 g (0.3 mol) of vinylbenzyl alcohol (synthesized from chloromethylstyrene (meta/para ratio of about 6/4) by the method described in *Polymer*, 14, 330 (1973), boiling point of 69°–73° C./0.4 mm Hg), 30.3 g (0.3 mol) of triethylamine, and 0.5 g of 2,6-di-t-butylphenol followed by ice-cooling. Then, 109.4 g (0.3 mol) of 2,2,3,3,4,4,5,5,6,6,7,7-dodecafluoro-n-heptanoic chloride prepared in the aforesaid step was added dropwise to the product under ice-cooling and stirring. Thereafter, the mixture was further stirred for 2 hours at room temperature and further refluxed for 1 hour with stirring. After cooling the reaction mixture, the triethylamine chloride formed was filtered away and the residue was washed twice with water and then further with an aqueous solution of sodium carbonate, and dried by anhydrous sodium carbonate. Then, when the product was purified twice by distillation, 61.0 g (yield of 44.0%) of 2,2,3,3,4,4,5,5,6,6,7,7-dodecafluoro-n-heptanoic acid vinylbenzyl ester (colorless liquid, boiling point of 106°–116° C./0.9 mm Hg, specific gravity of 1.47) was obtained.

SYNTHESIS EXAMPLE 2

Synthesis of Monomer (M-4), 2,2,3,3,4,4,5,5,6,6,7,7-dodecafluoro-n-heptanoic vinylbenzylamide In a 500 milliliter three neck flask equipped with a stirrer and a calcium chloride drying tube were placed 300 ml of acetonitrile, 33.9 g (0.3 mol) of vinylbenzylamine (synthesized from chloromethylstyrene (meta/para ratio of about 6/4) by the method described in *Kobunshi Gakkai, Yoko Shu* (*Polymer Society of Japan*), Vol. 26, page 834 (G3, C-07) (1977), boiling point of 82° C./1.5 mm Hg), 30.3 g (0.3 mol) of triethylamine, and 0.5 g of 2,6-di-t-butylphenol followed by ice-cooling. Then, 109.5 g (0.3 mol) of 2,2,3,3,4,4,5,5,6,6,7,7-dodecafluoro-n-heptanoic acid chloride prepared in Synthesis Example 1 was added dropwise to the mixture under ice-cooling and stirring. Thereafter, the mixture was stirred for 1 hour at room temperature and then triethylamine hydrochloride formed was filtered away. After distilling off the solvent, acetonitrile under reduced pressure, the residue was dissolved in 200 ml of ethyl acetate and in this case some white insoluble matters were filtered away. The residue formed was concentrated by vacuum distillation and then 300 ml of n-heptane was added to the concentrate and the mixture was cooled. The white crystals thus formed were recovered by filtration and dried in vacuum at room temperature, thereby 1 g (yield of 65.2%) of 2,2,3,3,4,4,5,5,6,6,7,7-dodecafluoro-n-heptanoic acid vinylbenzylamide (white or light yellow powder, melting point of 53°–57° C.) was obtained.

SYNTHESIS EXAMPLE 3

Synthesis of Polymer (P-1)

A 300-ml glass reactor of sealed tube type was charged with 20 g (0.043 mol) of monomer (M-4), 80 g (1.13 mol) of acrylamide, 80 ml of N,N-dimethylformamide and 2.85 g (0.012 mol) of benzoyl peroxide, and then was degassed and sealed hermetically. The reactor was heated in an oil bath (60° C.) for 72 hours to effect polymerization. The solid polymer produced was taken out of the reactor and left to stand in 500 ml of water for 72 hours to dissolve the soluble components. After filtration of the insoluble matter, the filtrate was poured into two liters of methanol to form a precipitate which was dissolved in 300 ml of water and dialyzed overnight. As a result, an aqueous solution of 540 g of an aqueous solution of a fluorine-containing polymer with a solids content of 6.5 wt% was obtained. The copolymerization ratio of the polymer as determined from elemental analysis was 2.1:97.9.

SYNTHESIS EXAMPLE 4

Synthesis of Polymer (P-6)

A 300-ml glass reactor of sealed tube type was charged with 1.15 g (2.5 mmol) of monomer (M-4), 7.0 g (0.0975 mol) of acrylic acid, 20 mg of N,N-dimethylformamide and 0.24 g (1.0 mmol) of benzoyl peroxide, and then was degassed and sealed hermetically. The reactor was heated in an oil bath (70° C.) for 64 hours to effect polymerization. The resulting polymer solution was poured into 100 ml of ethyl acetate to form a precipitate which was dissolved in 100 ml of water and dialyzed overnight. As a result, 120 g of an aqueous solution of a fluorine-containing polymer with a solids content of 3.6 wt% was obtained. The copolymerization ratio of the polymer as determined from elemental analysis was 2.0:98.0.

The amount of the polymer of this invention having the recurring unit shown by formula (I) that is used depends upon the kind, state, and coating system of photographic materials but is generally from 0.01 to 5.0 g, and preferably from 0.01 to 1.0 g per square meter of the photographic material.

The polymer of this invention shown by general formula (I) is applied to the photographic layers of photographic materials by incorporating it in the coating compositions for photosensitive silver halide emulsion layers or photoinsensitive auxiliary layers (e.g., backing layer, antihalation layer, interlayer, protective layer, etc.). The polymer may be applied in a solution of water or organic solvent (e.g., methanol, ethanol, acetone, methyl ethyl ketone, ethyl acetate, acetonitrile, dioxane, dimethylformamide, formamide, dimethyl sulfoxide, methyl cellosolve, ethyl cellosolve, etc.). The solution or dispersion of the polymer may be applied on the surface of photographic material by spraying or coating or may be immersed in the solution of the polymer followed by drying.

The polymer may be applied as an antistatic layer on a support together with a binder such as gelatin, polyvinyl alcohol, cellulose acetate, cellulose acetate phthalate, polyvinyl formal, or polyvinyl butyral.

The layer containing the polymer of this invention shown by general formula (I) or other layer or layers may further contain other antistatic agents, thereby obtaining a more preferable antistatic effect. Examples of such antistatic agents include polymers described in U.S. Pat. Nos. 2,882,157, 2,972,535, 3,062,785, 3,262,807, 3,514,291, 3,615,531, 3,753,716, 3,938,999, 4,070,189, 4,118,231 and 4,147,550, German Patent No. 2,800,466, Japanese Patent Application (OPI) Nos. 46733/74, 54672/75, 94053/75 and 129520/77; the surface active agents described in U.S. Pat. Nos. 2,982,651, 3,428,456, 3,457,076, 3,454,625, 3,552,872 and 3,655,387; the metal oxides and colloidal silica described in U.S. Pat. Nos. 3,062,700, 3,245,833 and 3,525,621 as well as so-called matting agents such as barium strontium sulfate, polymethyl methacrylate, methyl methacrylate/methacrylic acid copolymer, colloidal silica, and powder silica. Among the antistatic agents described above, it is preferred that each antistatic agent described in U.S. Pat. Nos. 4,070,189 and 4,118,231 respectively used together with each other.

The layer which contains the polymer of this invention includes silver halide emulsion layers, a subbing layer disposed at the silver halide emulsion layer side, interlayers, a surface protective layer, an overcoat layer, a back layer disposed at the opposite side to the silver halide emulsion layer. Of these layers, it is preferable to include the polymer in the uppermost surface layer such as a surface protective layer, overcoat layer, or back layer.

The supports for photographic materials to which the polymer of this invention is applied include films of polyolefin such as polyethylene; polystyrene; a cellulose derivative such as cellulose triacetate; and a polyesters such as polyethylene terephthalate; as well as baryta-coated papers, synthetic papers, and polymer-coated papers.

The support used in this invention may include an antihalation layer. An antihalation layer may include carbon black or various dyes such as oxonol dyes, azo dyes, allylidene dyes, styryl dyes, anthraquinone dyes, merocyanine dyes, and di- or triallylmethane dyes. Binders for the carbon black or dye include cellulose di- or monoacetate, polyvinyl alcohol, polyvinyl butyral, polyvinyl acetal, polyvinyl formal, polymethacrylic acid ester, polyacrylic acid ester, polystyrene, styrene/maleic anhydride copolymer, polyvinyl acetate, vinyl acetate/maleic anhydride copolymer, methyl vinyl ether/maleic anhydride copolymer, polyvinylidene chloride, and the derivatives of them.

Photographic materials which can make use of this invention include ordinary black-and-white silver halide photographic materials (e.g., photographic black-and-white photographic materials, X-ray black-and-white photographic materials, printing black-and-white photographic materials), ordinary multiplayer color photographic materials (e.g., color reversal films, color negative films and color positive films). The effect of this invention is particularly high when using silver halide photographic materials for high temperature quick processing and high speed silver halide photographic materials.

Photographic layers of the silver halide photographic materials of this invention are described below.

Useful binders for the photographic layers include protein such as gelatin and casein; cellulose compounds such as carboxymethyl cellulose, hydroxyethyl cellulose; sugar derivatives such as agar, sodium alginate and starch derivatives; synthetic hydrophilic colloids such as polyvinyl alcohol, poly-N-vinylpyrrolidone, polyacrylic acid copolymer, polyacrylamide, and the derivatives or partially hydrolyzed products thereof.

The term "gelatin" in this specification means so-called lime-processed gelatin, acid-processed gelatin, and enzyme-processed gelatin.

Gelatin may be partially or wholly replaced with a synthetic polymer as well as a so-called gelatin derivative. The term "gelatin" also includes gelatin denatured by treating the amino group, imino group, hydroxy group or carboxy group contained in the molecule of gelatin as a functional group with a reagent having one group capable of reacting with the group or a graft polymer prepared by grafting the molecular chain of a polymer to gelatin.

There are no particular restrictions on the method of preparation, and chemical sensitization method of the silver halide emulsion layers of the photographic materials, anti-fogging agents, stabilizers, hardening agents, antistatic agents, plasticizers, lubricants, coating aids, matting agents, whitening agents, spectral sensitizing dyes, dyes or color couplers used in this invention. Useful examples are described in *Product Licensing*, Vol. 92, 107–110 (December, 1971) and *Research Disclosure*, Vol. 176, 22–31 (December, 1978).

Particularly useful anti-fogging agents and stabilizers include 4-hydroxy-6-methyl-1,3,3a,7-tetraazaindene-3-methylbenzothiazole, 1-phenyl-5-mercaptotetrazole, as well as other various heterocyclic compounds, mercury-containing compounds, mercapto compounds and metal salts. Useful hardening agents include aldehyde compounds such as mucochloric acid, mucobromic acid, mucophenoxychloric acid, mucophenoxybromic acid, formaldehyde, dimethylolurea, trimethylolmelamine, glyoxal, monomethylglyoxal, 2,3-dihydroxy-1,4-dioxane, 2,3-dihydroxy-5-methyl-1,4-dioxane, succinaldehyde, 2,5-dimethoxytetrahydrofuran and glutaraldehyde; active vinylic compounds such as divinylsulfone, methylenebismaleimide, 5-acetyl-1,3-diacryloyl-hexahydro-s-triazine, 1,3,5-triacryloyl-hexahydro-s-triazine, 1,3,5-trivinylsulfonyl-hexahydro-s-triazinebis(vinylsulfonylmethyl)ether and 1,3-bis(vinylsulfonylmethyl)propanol-2, bis($\alpha$-vinylsulfonylacetamido)ethane; active halogen compounds such as 2,4-dichloro-6-hydroxy-s-triazine.sodium salt, 2,4-dichloro-6-methoxy-s-triazine, 2,4-dichloro-6-(4-sulfoanilino)-s-triazine.sodium salt, 2,4-dichloro-6-(2-sulfoethylamino)-s-triazine and N,N'-bis(2-chloroethylcarbamyl)piperazine; epoxy compounds such as bis(2,3-epoxypropyl)methylpropylammonium.p-toluenesulfonate, 1,4-bis(2',3'-epoxypropyloxy)butane, 1,3,5-triglycidyl isocyanurate and 1,3-diglycidyl-5-($\gamma$-acetoxy-$\beta$-oxypropyl)isocyanurate; ethyleneimine compounds such as 2,4,6-triethyleneimino-s-triazine, 1,6-hexamethylene-N,N'-bisethyleneurea and bis-$\beta$-ethyleneiminoethyl thioether; methanesulfonic acid ester compounds such as 1,2-di(methanesulfonoxy)ethane, 1,4-di(methanesulfonoxy)butane and 1,5-di(methanesulfonoxy)pentane; carbodiimide compounds; isooxazole compounds; and inorganic compounds such as chrome alum.

The photographic layers containing the polymer of this invention may further contain known surface active agents solely or as a mixture of them. Useful surface active agents include natural surface active agents such as saponin, etc.; nonionic surface active agents such as alkylene oxide series, glycerol series, and glycidol series surface active agents; cationic surface active agents such as higher alkylamines, quaternary ammonium salts, pyridine and other heterocyclic compounds, phosphoniums and sulfoniums; anionic surface active agents containing an acid group such as carboxylic acid, sulfonic acid, phosphoric acid, sulfuric acid ester and phosphoric acid ester; and amphoteric surface active agents such as aminoacids, aminosulfonic acids, aminoalcohol sulfuric acid or phosphoric acid ester.

The photographic materials of this invention may also contain in the photographic layers the alkyl acrylate series latices described in U.S. Pat. Nos. 3,411,911, 3,411,912 and 3,525,620.

The invention will be explained further by the following examples but the invention shall not be limited by these examples.

EXAMPLE 1

(1) Preparation of Sample

A black-and-white silver halide photographic material was prepared by coating a silver halide emulsion having the following composition on a polyethylene terephthalate film 180µ thick. The film had a subbing layer. After coating the silver halide emulsion thereon a protective layer having the following composition was coated thereon followed by drying. To the coating composition for the protective layer was added the polymer of this invention or well known antistatic agents.

| Silver Halide Emulsion Layer | |
|---|---|
| Thickness: about 5 microns | |
| Composition and coverage: | |
| Gelatin | 2.5 g/m$^2$ |
| Silver iodobromide | 5 g/m$^2$ |
| (1.5 mol % silver iodide) | |
| 1-Phenyl-5-mercaptotetrazole | 25 mg/m$^2$ |
| Protective Layer | |
| Thickness: about 1 micron | |
| Composition and coverage: | |
| Gelatin | 1.7 g/m$^2$ |

| | |
|---|---|
| 2,6-Dichloro-6-hydroxy-1,3,5-triazine sodium salt | 10 mg/m$^2$ |
| Sodium N—oleyl-N—methyltaurinate | 7 mg/m$^2$ |
| The polymer of this invention or comparison fluorine-containing surface active agent | See Table 1 |

Comparative Compound-1

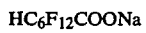
HC$_6$F$_{12}$COONa

Comparative Compound-2

(Disclosed in synthetic example-1 in British Pat. No. 1,497,256.)

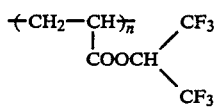

Comparative Compound-3

(Disclosed as a copolymer [10] in Japanese Patent Application (OPI) No. 129520/77.)

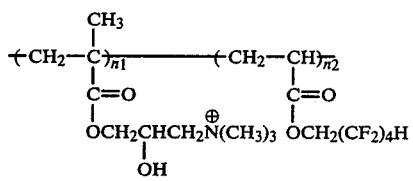

n$_1$:n$_2$ = 50:50

Comparative Compound-4

(Disclosed as synthetic example (1) in Japanese Patent Publication No. 23828/74.)

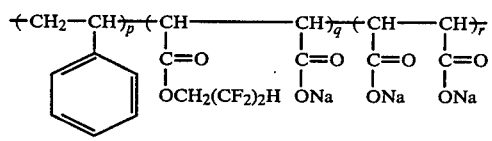

p:q:r = 50:20:30

Comparative Compound-5

(Disclosed as compound-1 in Japanese Patent Application (OPI) No. 158222/79.)

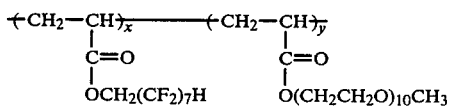

x:y = 40:60

(2) Test Method (2-1) Charged voltage measurement method:

The sample described above was cut into a rectangle of 30 cm×4 cm. Tow sheets of the sample were put together at the support surfaces using a duplicated adhesive tape so that the protective layers of both sheets were in the opposite sides. After humidifying each of the samples for 5 hours under the conditions of 25° C. and 25% RH, the sample was passed through two rotary white Neoprene rollers (roller diameter of 12 cm, width 1 cm, pressure between rollers of 6 kg/cm$^2$, and rotation line speed of 320 m/min), and then the charged voltage was measured by means of an electrometer in a Faraday cage.

(2-2) Deterioration test method:

After humidifying the above-described samples and white wood-free papers for 1 hour at 25° C. and 70% RH, the wood-free paper was sandwiched by 2 sheets of the sample so that the surfaces of the emulsion layers were brought into contact with both surfaces of the paper and they were placed in a polyethylene-laminated bag followed by sealing up. A load of 4 g/cm$^2$ was applied onto each sample assembly and they were allowed to stand in that state for 1 week at room temperature. Thereafter, the charged voltage was measured by the above-mentioned charged voltage measuring method and the results were compared with the results obtained by measuring before allowing the samples to stand for the definite period of time.

(2-3) Photographic property test:

These samples were exposed to a tungsten lamp through Filter SP-14, made by Fuji Photo Film Co., Ltd., developed (for 30 sec at 35° C.) in a developer having the following composition, fixed, washed with water, and then the photographic properties were determined.

| Developer Composition: | |
|---|---|
| Warm water | 800 ml |
| Sodium tetrapolyphosphate | 2.0 g |
| Anhydrous sodium sulfite | 50 g |
| Hydroquinone | 10 g |
| Sodium carbonate (monohydrate) | 40 g |
| 1-Phenyl-3-pyrazolidone | 0.3 g |
| Potassium bromide | 2.0 g |
| Water to make | 1,000 ml |

(2-4) Film strength test:

Samples were immersed in water at 25° C. for 5 minutes. A needle having a steel ball of 0.4 mm radius was brought into contact with the emulsion layer surface of each sample under pressure and while moving the needle over the surface at a speed of 5 mm/sec, the load applied onto the needle was continuously changed in the range of 0 to 200 g weight. Then the load which began to form scratches on the surface of the sample was measured.

(2-5) Adhesion resistance test:

Each of the samples was cut into a square sheet of 4 cm×4 cm. After humidifying these samples for 2 days at 25° C. and 70% RH, the surfaces of the silver halide emulsion sides of the two sheets were brought into contact with each other and while applying a load of 800 g onto the sheets, they were allowed to stand for one day under the conditions of 50° C. and 70% RH. The samples were separated from each other, the adhered urea was measured, and the result was evaluated by the following standard:

Rank A: 0–40% adhered area
Rank B: 41–60% adhered area
Rank C: 61–80% adhered area
Rank D: 81–100% adhered area (3) Test Results The results obtained are shown in Table 1.

TABLE 1

| Sample No. | Antistatic Agent (coating amount mg/m²) | Charged Voltage (volt) Before | Charged Voltage (volt) After | Photographic Properties Fog | Photographic Properties Sensitivity | Photographic Properties Maximum Density | Film Strength (g) | Evaluation of Adhesion Area | Remarks |
|---|---|---|---|---|---|---|---|---|---|
| 1 | — | +440 | +450 | 0.16 | 100 | 2.5 | 53 | Rank B | Control |
| 2 | Polymer of this invention P-1 (6) | +80 | 70 | " | " | " | 53 | Rank B | Invention |
| 3 | Polymer of this invention P-1 (8) | 0 | 0 | " | " | " | 53 | Rank A | " |
| 4 | Polymer of this invention P-1 (10) | −100 | −100 | " | " | " | 52 | Rank A | " |
| 5 | Polymer of this invention P-2 (6) | +100 | +110 | " | " | " | 52 | Rank B | " |
| 6 | Polymer of this invention P-2 (8) | +10 | 0 | " | " | " | 53 | Rank A | " |
| 7 | Polymer of this invention P-2 (10) | −90 | −100 | " | " | " | 52 | Rank A | " |
| 8 | Polymer of this invention P-4 (25) | −10 | −10 | " | " | " | 51 | Rank A | " |
| 9 | Polymer of this invention P-6 (10) | 0 | 0 | " | " | " | 52 | Rank B | " |
| 10 | Polymer of this invention P-10 (7) | 0 | +10 | " | " | " | 53 | Rank A | " |
| 11 | Comparative compound-1 (8.5) | +190 | +320 | 0.16 | 100 | 2.5 | 53 | Rank B | Comparative |
| 12 | Comparative compound-1 (12) | 0 | +160 | " | " | " | 53 | Rank B | " |
| 13 | Comparative compound-2 (60) | +90 | +100 | 0.17 | " | " | 46 | Rank C | " |
| 14 | Comparative compound-2 (85) | −10 | −10 | " | " | " | 40 | Rank C | " |
| 15 | Comparative compound-3 (90) | +20 | +25 | 0.20 | " | 2.3 | 41 | Rank D | " |
| 16 | Comparative compound-4 (150) | 0 | 0 | 0.17 | " | 2.5 | 45 | Rank C | " |
| 17 | Comparative compound-5 (40) | +10 | +15 | 0.16 | 90 | " | 49 | Rank B | " |

As the data in Table 1 shows, Sample No. 1 containing no antistatic agent had great static buildup, but Sample Nos. 3, 6, 8, 9 and 10 containing a suitable amount of the polymer according to this invention were substantially free from static buildup and the effect of the polymer changed little with time. Sample No. 12 containing a suitable amount of Comparative Compound 1 (fluorine-containing surfactant) was at first free from static buildup, but as time went by, considerable static buildup occurred. A large amount of Comparative Compounds 2, 3, 4 and 5 which were known fluorine-containing polymers were necessary for achieving the desired control of electrification voltage. The polymer of the invention had no adverse effect on the photographic characteristics, but Comparative Compounds 3 and 4 which were known fluorine-containing polymers caused increased fogging and achieved only low maximum density. Comparative Compound 5 which was also a known fluorine-containing polymer had low sensitivity. The polymer of this invention is no way reduced the film strength, but the samples containing Comparative Compounds 2, 3 and 4 had very low film strength. The samples containing Comparative Compounds 2, 3 and 4 were very low in blocking resistance, but the blocking resistance of the samples containing the polymer of this invention was equal to or even higher than that of the control.

While the invention has been described in detail and with reference to specific embodiments thereof, it will be apparent to one skilled in the art that various changes and modifications can be made therein without departing from the spirit and scope thereof.

What is claimed is:

1. A silver halide photographic element, comprising: a support; a plurality of photographic layers on the support including at least one silver halide emulsion layer, wherein one of said layers comprises a water-soluble polymer having a recurring unit represented by following general formula (I)

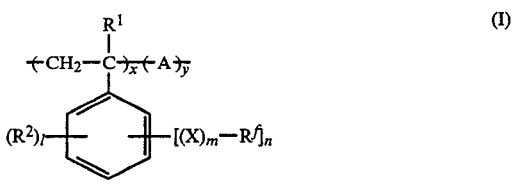

wherein A represents a monomer unit formed by copolymerizing a copolymerizable monomer having at least one ethylenically unsaturated group; $R^1$ represents hydrogen, a halogen atom, or an alkyl group having 1 to 3 carbon atoms; $R^2$ can represent a monovalent substituent, and when l is more than one, two $R^2$ groups together can represent an atomic group forming a ring; $R^f$ represents an alkyl group having 1 to 30 carbon atoms, an aralkyl group, an aryl group, or an alkylaryl group, wherein at least four hydrogens have been substituted for by fluorine atoms; X represents a divalent coupling group shown by $-(R)_p-L-$ (wherein R represents an alkylene group, an arylene group, or an aralkylene group; L represents an oxy group, a thioxy group, an imino group, a carbonyl group, a carboxy group, a carbothioxy group, a carboxyamido group, an oxycarbonyl group, a carbamoyl group, a sulfone group, a sulfonamido group, an N-alkylsulfonamido group, a sulfamoyl group, a sulfoxy group, or a phosphate group; and p is 0 or 1); l is an integer of 0 to 4; m is an integer of 0 to 3; n is an integer of 1 to 5; x is 0.1 to 50 mol%; and y is 50 to to 99.9 mol%, said water-soluble polymer being present in an amount sufficient to increase antistatic properties and provide good adhesion resistance.

2. A photographic element as in claim 1, wherein the polymer having the recurring unit represented by formula (I) is in the surface layer.

3. A photographic element as in claim 1, comprising: a support; a plurality of photographic layers on the support, wherein one of said layers comprising a water-soluble polymer having a recurring unit represented by formula (II)

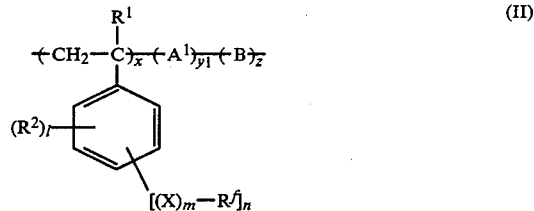

wherein $A^1$ is a monomeric unit wherein a copolymerizable monomer having an ethylenically unsaturated group and a solubility of at least 10 g per 100 g water is copolymerized; B is a monomeric unit wherein a copolymerizable monomer having an ethylenically unsaturated group and soluble in an amount of less than 10 g in 100 g of water is copolymerized; $R^1$, $R^2$, $R^f$, X, l, m and n have the same meaning as in formula (I) in claim 1; x is 0.1 to 50 mol%, $y_1$ is 20 to 99.9 mol%, and z is 0 to 79.9 mol%.

4. A photographic element as in claim 3, wherein $A^1$ is water-soluble nonionic monomer.

5. A photographic element as in claim 3, wherein $A^1$ is acrylamide or methacrylamide.

* * * * *